United States Patent [19]

Byrnes

[11] 4,139,016
[45] Feb. 13, 1979

[54] TAMPERPROOF HYDRANT LOCK WITH CONTROLLED SHOCK ABSORBER

[75] Inventor: Francis R. Byrnes, Philadelphia, Pa.

[73] Assignee: Center Compression Lock Company, Inc., Philadelphia, Pa.

[21] Appl. No.: 829,415

[22] Filed: Aug. 31, 1977

Related U.S. Application Data

[63] Continuation-in-part of Ser. No. 788,710, Apr. 19, 1977, Pat. No. 4,072,163, and a continuation-in-part of Ser. No. 697,581, Jun. 18, 1976, Pat. No. 4,062,375.

[51] Int. Cl.² .................. E03B 9/02; F16K 31/48; F16K 35/06
[52] U.S. Cl. .................. 137/296; 137/382.5; 251/54; 251/291
[58] Field of Search .............. 137/296, 382.5; 251/54, 251/291

[56] References Cited

U.S. PATENT DOCUMENTS

| | | | |
|---|---|---|---|
| 3,147,827 | 9/1964 | Weisheit | 251/54 X |
| 3,532,109 | 10/1970 | Smith | 137/296 |

Primary Examiner—Gerald A. Michalsky
Attorney, Agent, or Firm—Seidel, Gonda & Goldhammer

[57] ABSTRACT

A tamperproof hydrant lock with a controlled shock absorber. Power transmitting means are mounted on an operating rod extending within a chamber in the hydrant housing. A spring is mounted between the power transmitting means and the hydrant housing. First and second hydraulic means operatively associated with the power transmitting means control gradual opening and closing of the hydrant valve over first and second delay intervals of time respectively.

17 Claims, 5 Drawing Figures

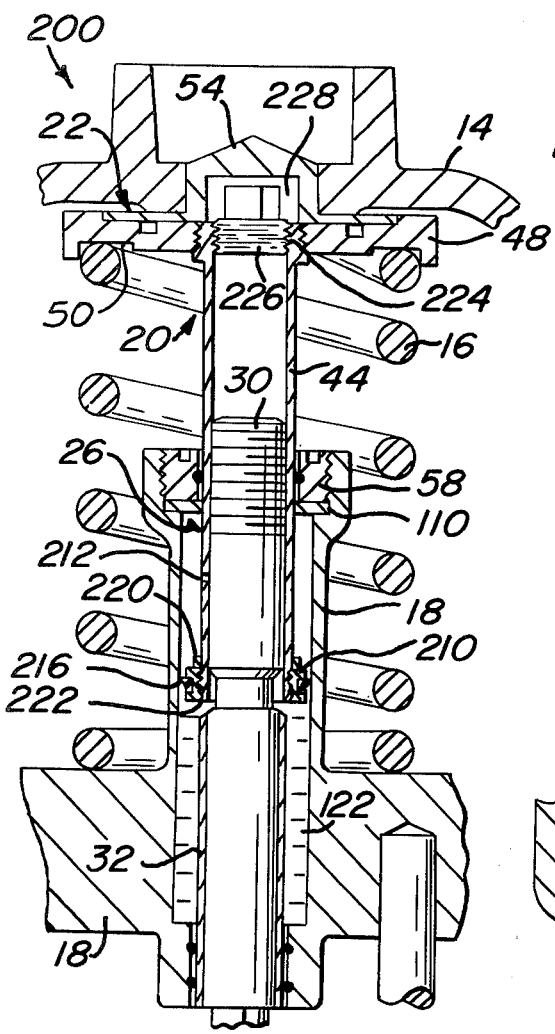
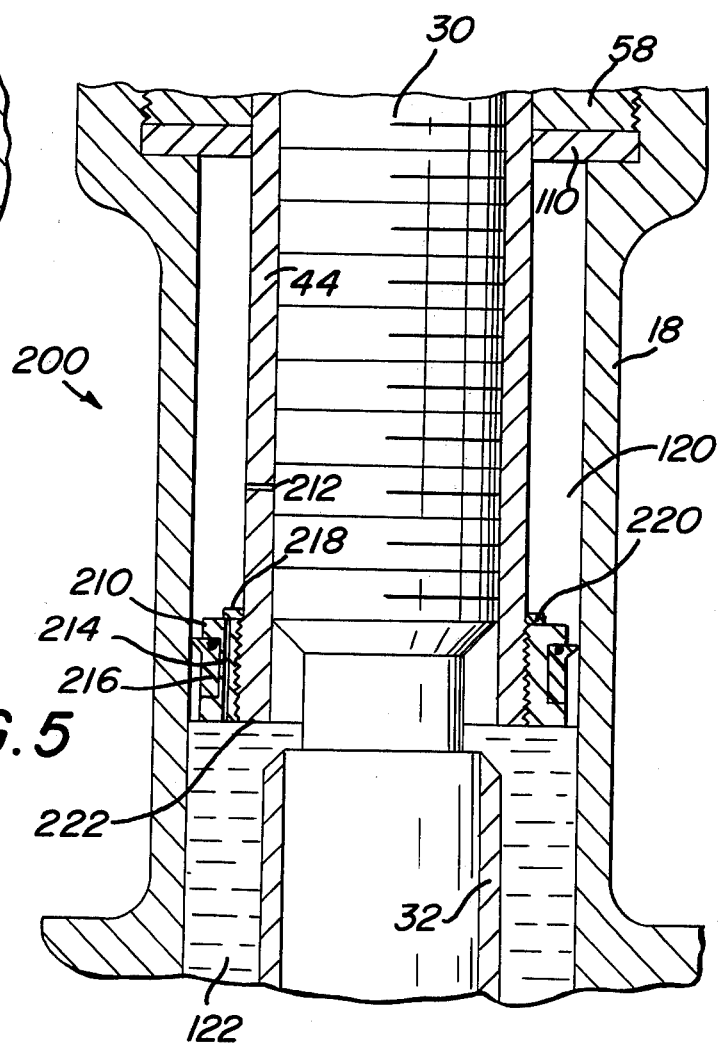

TAMPERPROOF HYDRANT LOCK WITH CONTROLLED SHOCK ABSORBER

This is a continuation-in-part application based on application Ser. No. 788,710 for "Tamperproof Lock With Shock Absorber" filed Apr. 19, 1977 now Pat. No. 4,072,163, and application Ser. No. 697,581 for "Tamper Proof Lock" filed June 18, 1976 now Pat. No. 4,062,375.

BACKGROUND OF THE INVENTION

The present invention is directed to a tamperproof hydrant lock with a controlled shock absorber. In particular, the invention is directed to a tamperproof hydrant lock with a controlled shock absorber comprising a series of parts which are easily assembled in combination with a subsisting fire hydrant. The lock is relatively inexpensive, simple and convenient to assemble, and is believed to be the first truly tamperproof lock of its kind. The lock can be sold in kit form to retrofit a subsisting hydrant.

There has been a long felt need for a tamperproof lock for a fire hydrant. The unauthorized use of fire hydrants has led to staggering losses of money and man-hours in attending to the readjustment of vandalized fire hydrants and their repair. Moreover, the unauthorized use of a fire hydrant may be extremely dangerous. Municipal reservoirs generally have a limited capacity to cope with the drainage posed by continuously open fire hydrants. Additionally, a vandalized hydrant may prove inoperable for emergency use.

Many attempts have been made to design a fire hydrant which is vandalproof. In general, these involve fresh designs for the entire hydrant and replacement of subsisting hydrants with completely new ones. Subsisting fire hydrants cannot be retrofitted conveniently to implement the proposed designs. Furthermore, the manufacture of a completely new fire hydrant is relatively costly. On a practical basis, these factors may render such designs useless. Accordingly, the vital problem of rendering subsisting fire hydrants tamperproof remains unsolved.

Apart from the practicalities of time and expense in implementing the designs of the prior art is the effectiveness of the design for the intended purpose: rendering the fire hydrant truly tamperproof. In general, prior art designs tend to be rather intricate and succeed only in making the fire hydrant somewhat more difficult to vandalize without actually achieving the goal of a fire hydrant which, for all intents and purposes, cannot be operated by unauthorized parties.

Various designs for valve locks and actuating mechanisms are disclosed in U.S. Pat. Nos. 3,070,115, 3,290,003, 3,361,154, 3,453,897, 3,456,679, 3,532,108, 3,532,109, 3,543,777, and 3,672,393. A fire hydrant with tamperproof features is disclosed in U.S. Pat. No. 3,532,109. The patent is directed to the new design of a bonnet, operating shaft and a screw jack or operating mechanism. The operating shaft is reciprocable within a bushing mounted within the interior of the bonnet. The end of the operating shaft and the bushing are accessible to the exterior of the bonnet. The bonnet is provided with a pair of holes which penetrate to the bushing surface. The screw jack includes a pair of spring-urged latches which are snapped apart and then positioned in the holes to retain the screw jack in an operative position.

Since the bushing is exposed, it apparently can be rotated, unscrewed and removed from the hydrant, providing access to the entire operating shaft. The exposed operating shaft might then be rotated and removed from the hydrant. In addition, once the bushing is removed, the interior of the housing is completely exposed and could be jammed with foreign matter and otherwise vandalized to render the hydrant inoperative.

Since the pair of bonnet holes penetrate to the bushing, the bushing could be deformed or otherwise vandalized to preclude operation of the shaft.

While the screw jack is mounted on the bonnet, the latches could be pried apart by an unauthorized party and the screw jack removed therefrom. Accordingly, the attendance of an authorized party would be required to continuously monitor the screw jack while it is mounted on the bonnet.

An advantage of the present invention is that it is truly tamperproof.

Another advantage of the invention is that it can be sold in kit form and used to retrofit a subsisting fire hydrant.

Another advantage of the invention is that the bulk of the components of a subsisting fire hydrant need not be re-designed or modified to implement the tamperproof lock.

Another advantage of the invention is that the operating rod is inaccessible to the bonnet exterior.

Another advantage of the invention is that the accessible portion of the lock is mechanically separated from the operating portion thereof so that the accessible portion of the lock can be hammered, chiseled or rotated without affecting the operating portion thereof.

Another advantage of the invention is that the means for exerting a force along the axis of the operating rod to reciprocate the rod can be locked on the hydrant bonnet and cannot be removed therefrom except by authorized personnel.

A further advantage of the invention is that it prevents sudden closing of the hydrant valve thereby avoiding water hammer and rupture of the water mains.

A still further advantage of the invention is that it provides controlled gradual opening and closing of the hydrant valve over predictable delay intervals of time.

Other advantages appear hereinafter.

BRIEF SUMMARY OF THE INVENTION

A tamperproof hydrant lock for use in a subsisting hydrant having a bonnet, a housing having an internal chamber, an operating rod extending within the housing chamber, a yoke coupled to the operating rod, and a plunger coupled to the yoke for opening and closing a hydrant valve. A spring is mounted on the housing. Power transmitting means are mounted on the operating rod for transmitting power to the rod against the spring. First hydraulic means operatively associated with the power transmitting means controls gradual opening of the valve over a first delay interval of time. Second hydraulic means operatively associated with the power transmitting means controls gradual closing of the valve over a second delay interval of time.

For the purpose of illustrating the invention, there is shown in the drawings a form which is presently preferred; it being understood, however, that this invention is not limited to the precise arrangement and instrumentalities shown.

BRIEF DESCRIPTION OF THE DRAWINGS

FIG. 4 is a cross-section of a tamperproof lock with a controlled shock absorber in accordance with the present invention.

FIG. 5 is an enlarged cross-section of the piston ring and operating rod and converter for effecting the control.

DETAILED DESCRIPTION OF THE INVENTION

Figure 1:
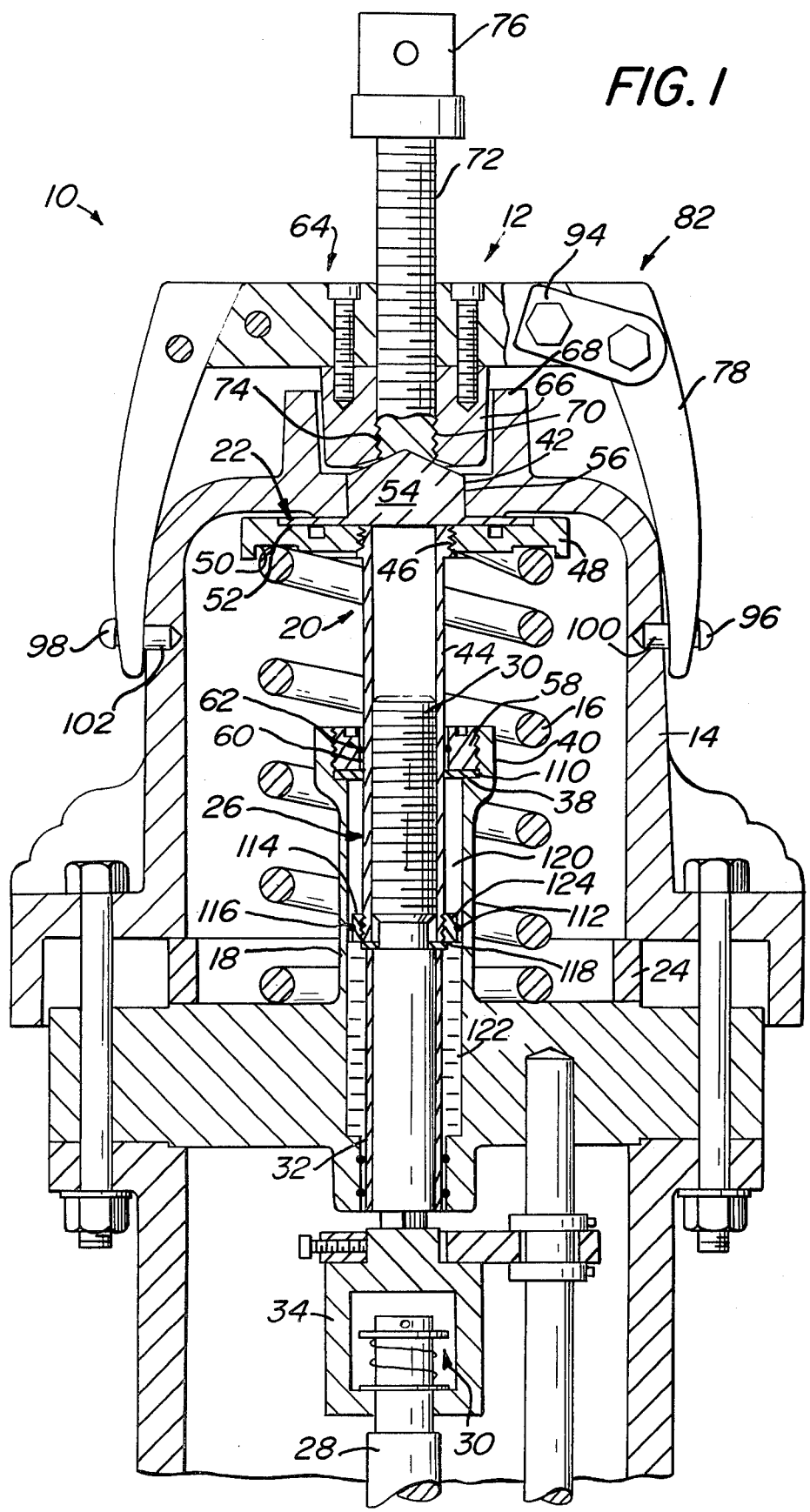
FIG. 1 is a cross-section view of a tamperproof lock with shock absorber but no control for the absorber.

Referring to the drawings wherein like numerals indicate like elements, there is shown in FIG. 1 a fire hydrant 10 retrofitted with a tamperproof lock with shock absorber. The shock absorber is effective but it lacks the control of the present invention. The lock is operated by power applying means 12 removably mounted on a bonnet 14. The lock comprises a helical spring 16 mounted on a housing 18, power transmitting means 20 seated on the spring 16, and a swivel plate 22 mounted on the power transmitting means 20. The bonnet 14 and housing 18 are conventional parts of a subsisting fire hydrant such as the fire hydrant used in the city of Philadelphia. The bonnet 14 is bolted to the housing 18. The bonnet and housing may be spaced apart by an annular spacer element 24 as will be described more fully below.

A yoke stem 26 and plunger element 28 are coupled together to operate the hydrant valve (not shown). The yoke stem and plunger element are parts of the subsisting hydrant. The yoke stem includes a threaded operating rod 30, a sleeve 32 mounted on the rod, and a yoke 34. The plunger element 28 depends from yoke 34 by means of a conventional washer and spring assembly 36. The threaded rod is usually a single piece steel forged construction and the sleeve is brass.

In conventional hydrants, an operating nut (not shown) having an annular shoulder is seated on an annular shelf 38 in the interior of a neck portion 40 of housing 18. The operating nut is threadedly mounted on the operating rod 30 and has a triangular nut top portion which extends through an aperture 42 in bonnet 14. The triangular nut is exposed to the bonnet exterior. A wrench (not shown) is fitted on the triangular nut and is rotated to operate the hydrant. Rotation of the operating nut in its seated position causes the operating rod 30 to advance downwardly to open the fire hydrant valve. To return the rod to its original position, the direction of rotation of the wrench is reversed. This causes the rod to advance upwardly thereby closing the fire hydrant valve.

Because reciprocating movement of yoke stem 26 is based on rotation of the exposed portion of the operating nut, the nut can be easily tampered with to open the hydrant valve. For example, a chisel can be driven into the exposed triangular nut, and the nut can be rotated to open the valve. Heretofore, to prevent tampering with the conventional operating nut, it was necessary to virtually redesign the entire hydrant. Thus, as disclosed in U.S. Pat. No. 3,532,109, the conventional hydrant bonnet can be replaced by a completely new design and a spring-loaded axial power mechanism inserted therein for reciprocating the operating rod. This approach is costly and, as previously described, is incapable of rendering the fire hydrant truly tamperproof since the operating rod itself would be exposed to the bonnet exterior and could easily be vandalized. The entire axial power mechanism could then be dismembered.

Figure 3:
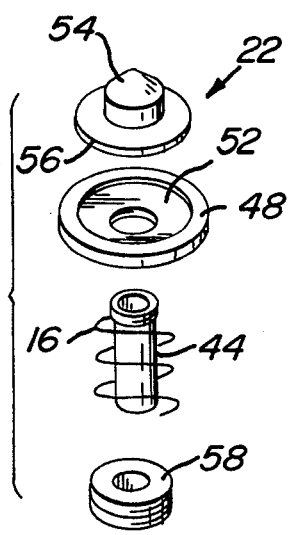
FIG. 3 is an exploded view of the lock components located within the hydrant bonnet.

In the retrofitted hydrant shown in FIG. 1, the operating portion of the lock is entirely hidden beneath the bonnet 14. The operating portion of the lock comprises the spring 16 and power transmitting means 20. See FIGS. 1 and 3. The spring may be calibrated at approximately 1000 lbs. per inch. The power transmitting means 20 comprises an operating nut converter 44, a pressure plate 48 and a modified retaining ring 58. An annular sealing washer 110 seated on shoulder 38 below retaining ring 58 extends around the circumference of converter 44. See FIG. 1. Preferably washer 110 is a flat neoprene washer.

The operating nut converter 44 is in the form of an internally threaded sleeve which is screwed on to operating rod 30. See FIG. 1. Preferably, converter 44 is made of silicon bronze. The exterior of the converter is threaded at its lower portion 112. A piston ring 114 is threadedly mounted on the converter at threaded portion 112. Preferably, the piston ring is made of bronze. The piston ring is provided with an O-ring 116 preferably made of neoprene. The O-ring obtrudes into a clearance 124 between the housing and piston without sealing the clearance.

The junction of the converter 44 and sleeve 32 is sealed by a sealing washer 118 which is also preferably neoprene. The lower portion of a housing chamber 120 is filled with hydraulic fluid 122 such as oil having a viscosity of 150 S.U.S. at 100°. The oil is introduced into the chamber before the retaining ring 58 is fastened in place. The washer 118 prevents hydraulic fluid from entering the interior of converter 44.

The converter 44 has an externally threaded top portion located above an annular shoulder 46. See FIG. 1. A pressure plate 48 is threadedly mounted on the top portion of the converter and is seated on the annular shoulder 46. The pressure plate 48 is provided with an annular recess 50 in its underside. The annular recess is adapted to receive one end of the spring 16. The top side of the pressure plate is provided with a circular recess 52. The swivel plate 22 is provided with a contoured hub portion 54 which fits in bonnet aperture 42 and is exposed to the exterior of the bonnet. The contoured hub portion is the only accessible portion of the lock. It cannot be rotated or otherwise operated to cause the operating portion of the lock to open the hydrant valve. The swivel plate has a circular base portion 56 which fits within circular recess 52. A solid film lubricant may be interposed between the circular base portion of the swivel plate and the pressure plate 48. The pressure and swivel plates may be made of steel.

To retrofit the subsisting hydrant with the tamperproof lock, it may be necessary to insert the annular spacer element 24 between bonnet 14 and housing 18. The spacer element elevates the bonnet with respect to the housing to allow for travel of rod 30 in opening the hydrant valve.

The modified retaining ring 58 facilitates vertical reciprocating motion of the operating nut converter 44 within the neck portion 40 of housing 18. The retaining ring is provided with a passage 60 and a rubber O-ring 62 for slidably contacting the converter 44. The sealing washer 110 prevents hydraulic fluid 122 from escaping from the housing chamber 120 through passage 60.

The power applying means 12 exerts a substantially vertical force along the axis of operating rod 30 to open the hydrant valve. The force applied by means 12 causes yoke stem 26 to advance downwardly against hydraulic fluid 122 and the return force of spring 16. The hydraulic fluid is displaced from the lower portion of chamber 120 below piston ring 114 through clearance 124 to the upper portion of the chamber above the piston ring. The hydraulic fluid flows upwardly through clearance 124 and retards the downward movement of the yoke stem. As a result, the plunger element 28 gradually opens the hydrant valve.

To close the hydrant valve, power applying means 12 is removed from the hydrant. As the power applying means 12 is removed, spring 16 returns the pressure plate 48 and yoke stem 26 upwardly to their original positions against the hydraulic fluid above the piston ring. This eases the hydrant valve into the closed position substantially without shock. The hydraulic fluid 122 above the piston ring flows downwardly through clearance 124 to provide the shock absorber effect.

If the power applying means 12 were suddenly removed from the hydrant without hydraulic fluid 122, the return force of the spring 16 would tend to snap yoke stem 26 back to its original position. This would cause sudden closing of the hydrant valve. Sudden closing of the valve is extremely undesirable. It can create a water hammer with consequent damage to the hydrant and possible rupture of the water main itself. The shock absorber effect provided by the hydraulic fluid 122 and piston ring 114 prevents sudden closing of the hydrant valve. Accordingly, the ring 114 and fluid 122 substantially eliminate the danger of damage to the hydrant and/or water mains due to sudden removal of power applying means 12.

The retrofitted hydrant shown in FIG. 1 has proved to be extremely effective in preventing water hammer. However, the shock absorber effect provided by the hydrant does not permit separate flexible control of the upward and downward strokes of the piston ring 114 against the hydraulic fluid 122. Both the upward and downward strokes of the piston ring are controlled by the flow of hydraulic fluid 122 through the single clearance 124 between the piston ring and housing.

In general, the viscosity of fluid 122 and the size of clearance 124 are chosen to produce a relatively long time interval for the upward stroke of the piston ring. The upward stroke of the piston ring in turn defines the interval of time required to close the hydrant valve. A relatively long interval of time for the upward stroke is desirable to provide a safety margin against water hammer as previously described. Since, however, the same clearance 124 conducts fluid 122 between the upper and lower chambers of the housing during upward and downward strokes of the piston ring, the interval of time for the downward stroke of the piston ring may be objectionably long. The downward stroke of the piston ring in turn defines the interval during which the hydrant valve is opened. In emergency situations, it is desirable to open the hydrant valve as quickly as possible. A relatively long interval of time for the downward stroke should be avoided.

The present invention solves the foregoing problem by providing separate hydraulic means for controlling the upward and downward strokes of the piston ring. The hydraulic means entail a new design for the piston ring and a unique modification of the operating nut converter as will be described hereinafter in connection with FIGS. 4 and 5.

In FIG. 4 there is shown a retrofitted hydrant 200 having separate hydraulic means for controlling the upward and downward strokes of a piston ring 210 in accordance with the present invention. The piston ring 210 is threadedly mounted on the lower portion of operating nut converter 44. The piston ring regulates the opening but not the closing of the hydrant valve. Closing of the valve is controlled by a second hydraulic means represented by a passage 212 in converter 44.

The piston ring 210 and converter passage 212 are shown in detail in FIG. 5. The piston ring 210 is provided with an annular recess 214. A U-ring is seated in the recess. The U-ring has a flanged lip which wipes against the interior wall of housing 18. A vertical passage 218 extends through the piston ring. An annular washer 220 is seated on the topside of the piston ring. The washer 220 covers passage 218.

On the downward stroke of the piston ring 210 (opening the hydrant valve), hydraulic fluid 122 is displaced upwarding via two paths. First, the fluid is displaced through passage 218. The fluid exerts a lifting force against the washer 220. The passage and washer co-act as a one-way valve. The washer yields somewhat during the downward stroke to permit the passage of the hydraulic fluid to the upper portion of chamber 120 above the piston ring. But the washer prevents fluid from entering passage 218 at the topside of the piston ring during the return or upward stroke (closing the hydrant valve). Second, the fluid travels upwardly through the gap between sleeve 32 and bottom 222 of converter 44, along the threaded interface between operating rod 30 and converter 44, and through passage 212 in the converter to the upper portion of chamber 120 above the piston ring.

If either passage 212 or 218 becomes clogged, the other passage will act as the exclusive path of flow for the hydraulic fluid. This provides a measure of safety in operation under adverse environmental conditions. So long as both passages 212 and 218 do not become clogged at the same time, the pressure exerted by fluid 122 against the U-ring flange will not be great enough to break the seal provided by the flange. However, if both passages become clogged simultaneously the pressure against the U-ring flange will increase until the seal is broken. The hydraulic fluid then will flow to the upper portion of chamber 120 above the piston ring via the clearance between the flange and the interior wall of housing 18. This is an important safety feature of the invention.

U-Ring 216 is made of an elastomeric material. The U-ring is an off-the-shelf item having a circular split or groove in which an O-ring is wedged to press the flange lip radially outwardly. The flanged lip, however, is flexible under extreme pressure so that the lip will eventually yield under pressure if passages 212 and 218 become clogged.

Preferably, the cross-sections of passages 212 and 218 are sized to provide a relatively quick opening action for the hydrant valve. The speed with which the valve is opened can also be varied by providing the piston ring 210 with a plurality of passages 218 and by varying the number of such passages. The more passages, the quicker the opening action for the valve. Each passage 218 would be covered by the washer 220. Each passage would act as a one-way valve permitting flow of fluid 122 to the upper portion of chamber 120 during the down stroke of the piston ring.

Similarly, the speed with which the valve is opened can be varied by providing converter 44 with a plurality of passages 218 and by varying the number of such passages.

During the upward stroke of the piston ring (closing the hydrant valve), the hydraulic fluid in the upper portion of chamber 120 is conducted through passage 212, along the threaded interface between converter 44 and operating rod 30, to the lower portion of chamber 120 below piston ring 210. During the up stroke fluid flows through passage 212 only. Washer 220 prevents any fluid from entering passage 218 at the topside of the piston ring. And the flanged lip of U-ring 216 maintains the seal between the piston ring and the interior wall of housing 18.

Flow of fluid through passage 212 and the interface between the converter and operating rods during the up stroke is substantially slower than flow in the reverse direction through the combined paths of passages 212 and 218 during the down stroke. Accordingly, the up stroke of the piston ring takes place over a substantially longer interval of time than the down stroke. As a result, the hydrant valve requires a substantially longer interval of time to close than to open. A relatively long closing interval is desirable as it reduces the possibility of water hammer.

The length of time for the up stroke of the piston ring (closing the hydrant valve) can be varied by varying the size of the cross-section of passage 212 and/or by providing plural passages 212 in converter 44. Preferably, each of the passages 212 is sized to produce a relatively slow closing action for the valve.

It is particularly important that the gap between sleeve 32 and the bottom 222 of converter 44 is not sealed in the present invention. Compare FIGS. 1 and 5. The gap cannot be sealed because the fluid 122 must flow in both directions through passage 212, along the threaded interface of converter 44 and operating rod 30, between the upper and lower portions of chamber 120.

Maintaining the gap open also enables a subsisting hydrant to be retrofitted more rapidly. It has been found that the vertical gap between sleeve 32 and the bottom 222 of converter 44 varies considerably from hydrant to hydrant. This is due to the variations in the distance between the hydrant valve and the hydrant itself. Thus, certain valves may be more deeply positioned than others in their valve seats (not shown). The variance in distance from the hydrant is accommodated by varying the depth that operating rod 30 is screwed into converter 44. For certain screw depths, the gap between sleeve 32 and the bottom 222 of converter 44 may be too great to permit sealing by a single standard washer. A non-standard washer of increased thickness or combinations of washers may be required to seal the gap.

Selection of the washer size and placement of the washer to seal the gap are time-consuming operations. The present invention completely eliminates these operations by eliminating the seal between sleeve 32 and the bottom 222 of converter 44. Variations in the size of the gap due to variations in the location of the hydrant valve with respect to the hydrant itself do not significantly affect operation of the invention.

Since the gap between sleeve 32 and converter 44 is not sealed, the fluid 122 is free to enter the interior of the converter. Fluid could read the underside of swivel plate 22 and escape through the interface between the swivel plate and the pressure plate 48. To prevent the escape of fluid, the converter 44 is provided with interior threading at its upper portion 224, and a pipe plug 226 is threaded into the converter. The swivel plate 22 is provided with a cylindrical cavity 228 which is sized to accommodate the plug.

In retrofitting the hydrant, fluid 122 is introduced into chamber 120 by pouring the fluid into the interior of the converter. If too much fluid is introduced into the chamber the piston ring 210 may be prevented from executing a complete down stroke with the plug 226 threaded on the converter. As a result, the hydrant valve would remain closed. Accordingly, plug 226 is not threaded on the converter until one complete down stroke of the piston ring has been executed. During the down stroke, excess fluid is displaced upwardly through the interior of converter 44. The excess fluid spills over onto pressure plate 48; and it can be easily wiped away with a piece of cloth. Thereafter, the piston is made to execute an up stroke and the plug 226 is threaded on the converter to seal the converter interior. The amount of fluid retained in chamber 120 will be enough to provide the desired shock absorber effect while permitting complete up and down strokes of the piston ring.

Figure 2:
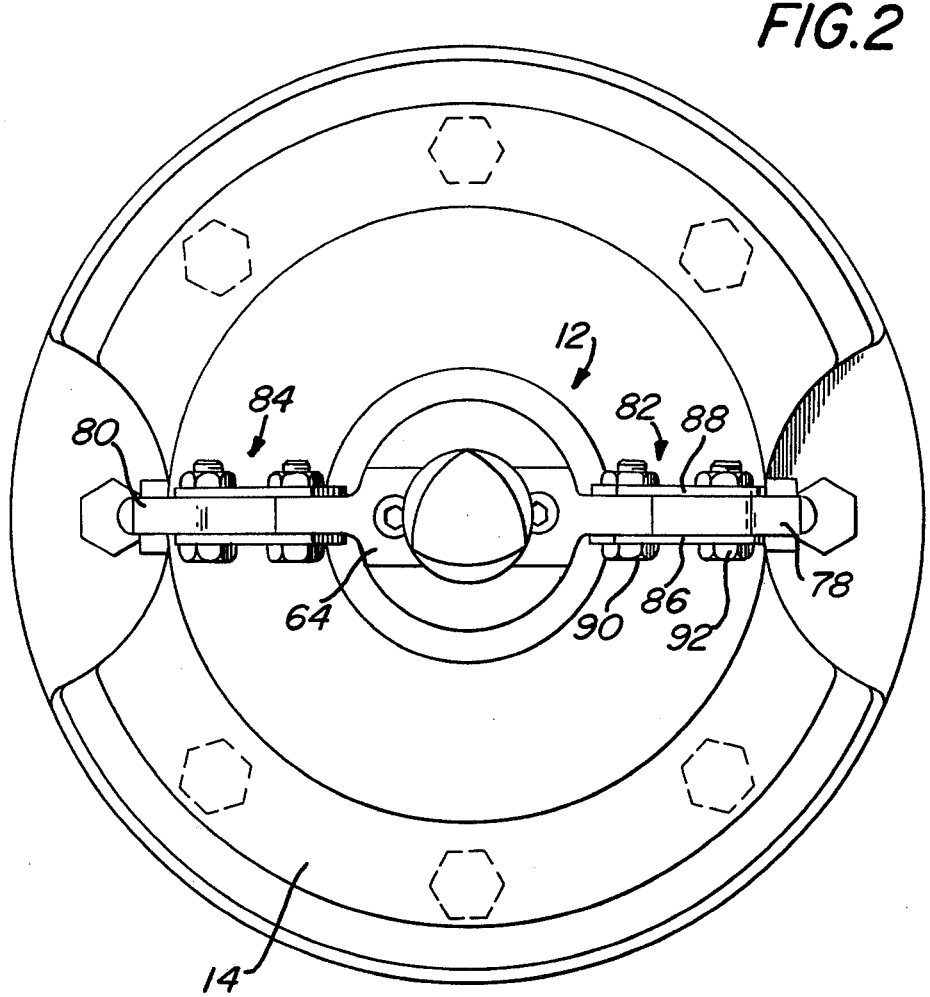
FIG. 2 is a plan view of the power transmitting means mounted on the bonnet.

Opening and closing the hydrant valve is governed by power applying means 12. See FIGS. 1 and 2. Power applying means 12 is removably mounted on bonnet 14. Power applying means 12 includes a collar 64 with a boss-like member 66 which fits within a circular wall 68 at the top of bonnet 14. The collar is provided with a threaded passage 70. A screw member 72 having a conically-shaped recess 74 at one end and a triangular nut 76 at the other end threadedly engages collar passage 70. The conically-shaped recess 74 is adapted to matingly contact the contoured hub portion 54 of swivel plate 22. The screw member 72 can be advanced in passage 70 by fitting a conventional wrench on triangular nut 76 and rotating the wrench.

A pair of arms 78 and 80 are pivotably connected to the collar 64 via locking means 82 and 84, respectively. Locking means 82 and 84 are identical as are arms 78 and 80. Accordingly, only interconnection of collar 64, locking means 82 and arm 78 will be described herein, it being understood that collar 64, locking means 84 and arm 80 are interconnected in an identical fashion.

Locking means 82 comprises a pair of pivot plates 86 and 88 which are pivotably bolted to collar 64 and arm 78 by means of bolts 90 and 92, respectively. The locking means 82 provides a double pivot joint for arm 78. The arm is provided with a contoured surface 94 which is shaped so as to maintain flush contact with an associated portion of the exterior surface of collar 64 when the power applying means is locked on the bonnet 14.

The arms 78 and 80 are provided with pins 96 and 98, respectively. The pins fit in a pair of opposed holes 100 and 102 which are drilled in bonnet 14. The pair of holes 100 and 102 reresents the only modification of the hydrant bonnet required herein. The bonnet need not be replaced or otherwise substantially modified.

The power applying means 12 is mounted on bonnet 14 by inserting pins 96 and 98 in place in holes 100 and 102. the bosslike member 66 is inserted within the circular bonnet wall 68. The screw member 72 is advanced within passage 70 to bring it into mating contact with the contoured hub portion 54 of swivel plate 22. As the screw member 72 advances further within passage 70, the bosslike member 66 rises slightly and the contoured surfaces of arms 78 and 80 facing collar 64 contact associated portions of the exterior surface of the collar in a substantially flush manner to rigidly lock pins 96 and 98 into holes 100 and 102.

Further rotation of the screw member 72 causes the member to advance within passage 70 and bear against the contoured hub portion 54 of swivel plate 22. The downward force applied through screw member 72 is transmitted by power transmitting means 20 to the yoke stem 26. The yoke stem displaces the plunger 28 downwardly to open the hydrant valve. Spring 16 and hydraulic fluid 122 exert an upward return forces against the undersides of pressure plate 48 and piston ring 114 respectively. The upward return force supplied by the hydraulic fluid increases the force required to open the hydrant valve, accentuating the tamperproof features of the lock.

When the underside of the pressure plate contacts the neck portion 40 of housing 18, equal forces are exerted on the neck portion 40 by the pressure plate and on the bonnet 14 and collar 64 by arms 78 and 80. Any attampt to pry the arms 78 and 80 apart will be fruitless as the arms and collar remain in substantially flush contact along the contoured surface of the arms. Thus, the collar 64 cannot be moved axially or rotationally while the power applying means is rigidly locked to the bonnet.

To remove power applying means 12 from bonnet 14, screw member 72 must be rotated so that the member travels upwardly in passage 70. The return force exerted by spring 16 is transmitted through power transmitting means 20 to yoke stem 26. The yoke stem gradually travels upwardly towards its original rest position. The displaced hydraulic fluid above piston ring 114 exerts a downward reactive force on the topside of the piston ring. The downward reactive force prevents sudden return of the yoke stem to its original rest position. When the contoured portion 54 of swivel plate 22 is returned to its original position flush against bonnet 14 within aperture 42, the yoke stem 26 and plunger 28 maintain the hydrant valve closed. Further rotation of the screw member 72 in contact with the contoured hub pirtion 54 of swivel plate 22 causes the boss-like member 66 to drop slightly, thereby releasing arms 78 and 80 from substantially flush contact therewith. The arms can then be pivoted outwardly from the bonnet 14 and the entire power applying means 12 can then be lifted off the bonnet.

In operation, the power transmitting means 12 must be kept rigidly locked on bonnet 14 to maintain the hydrant valve open against the return force of spring 16. Since the power transmitting means will automatically lock in rigid fashion on the bonnet 14 the hydrant, with the power transmitting means locked thereon, can be left unattended without danger of unauthorized removal of the power transmitting means when the conventional wrench is removed therefrom.

When the fire hydrant valve is closed, the contoured hub portion 54 of swivel plate 22 is the only surface of the tamperproof lock which is accessible to the bonnet exterior. If an unauthorized party attempts to rotate the contoured hub portion, the swivel plate will rotate freely within circular recess 52 and pressure plate 48. The power transmitting means 20 will then transmit no power to the yoke stem 26, precluding operation of the hydrant valve. The only practical way to operate the fire hydrant valve is through operation of the power applying means 12. The lock therefore is truly tamperproof.

An advantage of the invention is that the hydrant valve can be quickly opened for use in an emergency situation. The valve, however, can be closed relatively slowly to prevent water hammer. The shock absorber effects in opening and closing the valve may be separately controlled. The time and expense in selecting and placing assorted sizes of washers to seal the gap between the sleeve 32 and converter are completely eliminated. A subsisting hydrant may be rapidly retrofitted according to the invention.

The present invention may be embodied in other specific forms without departing from the spirit or essential attributes thereof and, accordingly, reference should be made to the appended claims, rather than to the foregoing specification as indicating the scope of the invention.

I claim:

1. In a fire hydrant including a bonnet having an aperture, a housing having an internal chamber, an operating rod extending within the housing chamber, a yoke coupled to the operating rod, and a plunger coupled to the yoke for opening and closing a valve, a tamperproof lock comprising:

a spring mounted on the housing:

power transmitting means mounted on the operating rod for transmitting power to said rod against said spring;

first hydraulic means operatively associated with said power transmitting means for controlling gradual opening of the valve over a first delay interval of time; and second hydraulic means operatively associated with said power transmitting means for controlling gradual closing of the valve over a second delay interval of time.

2. The tamperproof lock according to claim 1 including a swivel plate mounted on said power transmitting means for rotational movement thereon, said swivel plate having a contoured hub portion adapted to fit within the bonnet aperture.

3. The tamperproof lock according to claim 1 including power applying means removably mounted on the bonnet for applying power substantially along the axis of the operating rod to move the operating rod against said spring and said hydraulic means.

4. The tamperproof lock according to claim 2 wherein said power applying means includes a collar having a passage, means reciprocable in said collar passage for contacting said swivel plate hub portion to apply power to said power transmitting means, locking means pivotably connected to said collar, means pivotably connected to said locking means for preventing axial and rotational movement of said collar, said preventing means having a contoured portion for substantially flush contact with the exterior of said collar, said preventing means being adapted for removable coupling to the exterior of the bonnet.

5. The tamperproof lock according to claim 1 wherein said first hydraulic means includes a piston ring having at least one passage for conducting hydraulic fluid in a first direction only, and said second hydraulic means includes an operating nut converter mounted on said operating rod, said operating nut converter having at least one passage for conducting the hydraulic fluid in at least a second direction.

6. The tamperproof lock according to claim 5 including safety means for conducting hydraulic fluid in said first direction if said piston ring and operating nut converter passages are clogged.

7. In a fire hydrant including a housing having an internal chamber for receiving hydraulic fluid, an operating rod extending within the housing chamber, a yoke coupled to the operating rod, and a plunger coupled to the yoke for opening and closing a valve, the combination comprising:
  a modified retaining ring mounted on the housing;
  an operating nut converter mounted on the operating rod, said operating nut converter having at least one passage for passing hydraulic fluid in at least a first direction;
  a pressure plate mounted on said operating nut converter;
  a swivel plate mounted on said pressure plate for rotational movement thereon, said swivel plate having a contoured central hub portion;
  a piston ring mounted on said operating nut converter, said piston ring having at least one passage therein for passing the hydraulic fluid in a second direction only; and
  a spring mounted between the housing and said pressure plate whereby said spring exerts an upward force against the underside of said pressure plate.

8. The combination according to claim 7 including a bonnet coupled to the housing, said bonnet having an aperture for receiving said contoured central hub portion of said swivel plate, and means removably mounted on said bonnet for exerting a force substantially along the axis of the operating rod to move the rod against said spring and hydraulic fluid.

9. The combination according to claim 8 wherein said exerting means includes a screw member having a nut at one end and a contoured recess at the other end, said screw member being adapted to matingly contact said contoured central hub portion of said swivel plate, a collar having an internally threaded passage for threadedly engaging said screw member to permit said screw member to move reciprocatingly therein, locking means pivotably connected to said collar at opposed ends thereof, a pair of arms pivotably connected to said locking means at opposed ends of said collar, each of said arms having a pin adapted to fit securely within one of said bonnet wall holes and a contoured portion for substantially flush contact with the exterior of said collar to prevent axial and rotational movement of said collar.

10. The combination according to claim 7 including safety means for conducting hydraulic fluid in said second direction if said piston ring and operating nut converter passages are clogged.

11. The combination according to claim 10 wherein said safety means includes a U-ring secured to the periphery of said piston ring.

12. In a fire hydrant including a bonnet having an aperture, a housing having an internal chamber, an operating rod extending within the housing chamber, a yoke coupled to the operating rod, and a plunger coupled to the yoke for opening and closing a valve, a tamperproof lock comprising:
  a spring mounted on the housing;
  power transmitting means mounted on the operating rod for transmitting power to said rod against said spring;
  first hydraulic means operatively associated with power transmitting means for controlling gradual opening of the valve over a first delay interval of time;
  second hydraulic means operatively associated with said power transmitting means for controlling gradual closing of the valve over a second delay interval of time; and
  power applying means removably mounted on the bonnet for applying power substantially along the axis of the operating rod to move the rod against said spring.

13. The tamperproof lock according to claim 12 including a swivel plate mounted on said power transmitting means for rotational movement thereon, said swivel plate having a contoured hub portion adapted to fit within the bonnet aperture.

14. In a fire hydrant including a housing having an internal chamber, an operating rod extending within the housing chamber, a yoke coupled to the operating rod, and a plunger coupled to the yoke for opening and closing a valve, the combination comprising:
  a modified retaining ring mounted on the housing;
  an operating nut converter mounted on the operating rod, said operating nut converter extending within the housing chamber, said operating nut converter having at least one passage therein for passing hydraulic fluid in at least a first direction;
  a pressure plate mounted on said operating nut converter;
  a swivel plate mounted on said pressure plate for rotational movement thereon, said swivel plate having a contoured central hub portion;
  a piston ring mounted on said operating nut converter, said piston ring having at least one passage therein for passing the hydraulic fluid in a second direction only;
  a spring mounted between the housing and said pressure plate;
  a bonnet having an aperture for receiving said contoured central hub portion of said swivel plate; and
  means removably mounted on said bonnet for exerting a force substantially along the axis of the operating rod to move the rod against said spring and hydraulic fluid.

15. A fire hydrant including a valve, comprising:
  a bonnet having an aperture;
  a housing coupled to said bonnet, said housing having an internal chamber;
  an operating rod extending within said housing chamber for causing a valve to open and close;
  a spring mounted on said housing;
  power transmitting means mounted on said operating rod for transmitting power to said rod against said spring;
  first hydraulic means operatively associated with said power transmitting means for controlling gradual opening of the valve over a first delay interval of time; and
  second hydraulic means operatively associated with said power transmitting means for controlling gradual closing of the valve over a second delay interval of time.

16. The fire hydrant according to claim 15 including swivel means rotatably mounted on said power transmitting means, said swivel means having a contoured portion adapted to fit within said bonnet aperture.

17. The fire hydrant according to claim 15 including power applying means removably mounted on said bonnet for applying power substantially along the axis of the operating rod to move the rod against said spring and hydraulic means.

* * * * *